Jan. 8, 1935.     W. L. MORRIS     1,987,023
LUBRICATION DEVICE
Filed Aug. 3, 1931     2 Sheets-Sheet 1

INVENTOR.
WILLIAM L. MORRIS
BY
John A. Watson
ATTORNEY.

Jan. 8, 1935.   W. L. MORRIS   1,987,023
LUBRICATION DEVICE
Filed Aug. 3, 1931   2 Sheets-Sheet 2
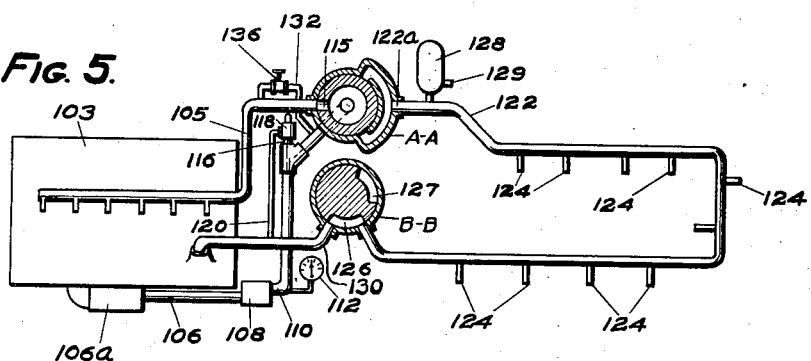
FIG. 5.
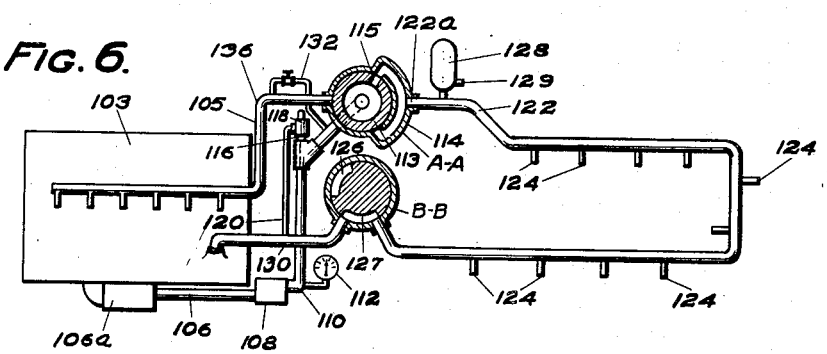
FIG. 6.
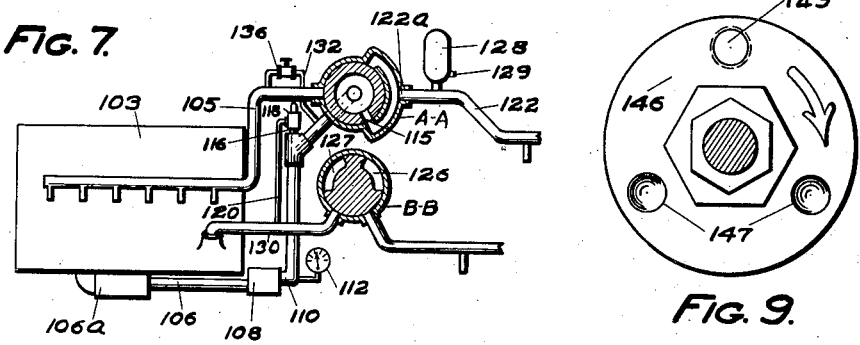
FIG. 7.
FIG. 9.
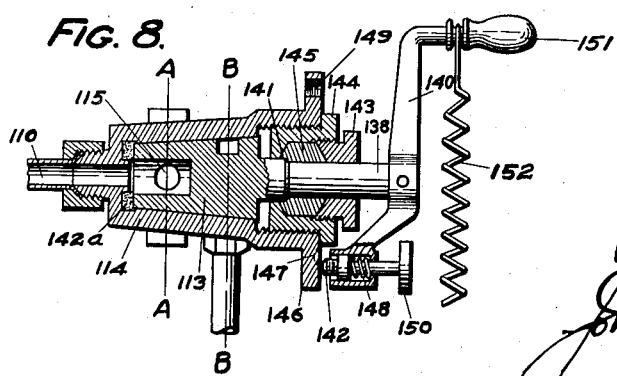
FIG. 8.
INVENTOR.
WILLIAM L. MORRIS
BY
John A. Watson
ATTORNEY Patented Jan. 8, 1935

1,987,023

UNITED STATES PATENT OFFICE 1,987,023

LUBRICATION DEVICE

William L. Morris, Wilmette, Ill., assignor to The Lubrication Corporation, South Bend, Ind., a corporation of Delaware Application August 3, 1931, Serial No. 554,643

5 Claims. (Cl. 184—7)

This invention relates to lubrication devices and more particularly to a system of lubrication for automobiles, in some respects similar to certain systems sometimes called "one-shot" systems. In the operation of a lubrication system constructed according to my invention a predetermined amount of lubricant is forced to, but not designedly into, each bearing to be lubricated during each cycle of operation.

Prior to my invention there have been designed so-called "one-shot" systems in which an attempt is made to force lubricant by a single operation to all of the bearings of an automobile and in which under ideal conditions, a predetermined amount can possibly be forced to each bearing. However, in all of the prior art systems of which I am aware, the designer depends upon frictional resistance for determining the amount of lubricant fed to each bearing, and the systems may be called "frictional resistance" systems. Due to inequalities in the amount of frictional resistance met at each bearing, such systems are sometimes unsatisfactory in continued use. The frictional resistance in passing through a small diameter passage is naturally greater than that met with in passing through a passage of slightly larger diameter. Material inequalities in the diameters of passages which should be identical become almost unavoidable (where all of the passages must be as small as are required in the operation of the frictional resistance systems) due to differences in machining the various parts. Moreover, often the resistance of each bearing itself will vary from that of the other bearings and often the resistance of each identical bearing will vary in itself from time to time. Bearings at times become "frozen" so that it is almost impossible to force lubricant thereinto. Such bearings, when an attempt is made to lubricate them by a one-shot frictional resistance system, will receive little or no lubricant, while other bearings will receive a plentiful supply. It is to be especially noted that tight and frozen bearings are the ones which most need lubrication. In fact, in a lesser degree, it is always the bearings which occasion the most resistance which are most in need of lubrication but which in frictional resistance one-shot systems on account of said resistance receive little or no lubrication.

Moreover, applicant believes that frictional resistance one-shot systems are invariably and of necessity must be, systems in which the lubricant is supplied to the bearing almost instantaneously so that for the time the bearing has an over-supply of lubricant, and thereafter until the time of the next supply, the bearing receives no more lubricant. Thus there must be either insufficient lubrication or a waste of lubricant.

Moreover, it is necessary to use very fine passages in order to approximate an operative frictional resistance system. Such passages are particularly liable to clogging and stoppages which cause breakdowns of the system.

Furthermore, in all of the previous one-shot systems of which applicant is aware, the lubricant has been forced from the central reservoirs to the various passages and bearings by means of resiliently pressed plungers. By reason thereof it is impossible for operators to determine whether the lubricant is being supplied to the bearings in a correct manner through the fine passages necessary in such systems or whether the lubricant is being wasted through a leaky joint. In this connection it is to be noted that in such a case the resiliently pressed plunger will move indiscriminately to force the lubricant out through a leaky joint or into the bearing passages or distribute it proportionately to leaky joints and bearing passages depending upon the amount of resistance encountered in the passages or in the leaky joints.

One of the objects of my invention, therefore, is to provide an efficient and reliable system of one-shot lubrication for automobiles.

A further object of the invention is to provide, in the operation of such a system, for the delivery of lubricant to all of the bearings normally at relatively low pressure.

A further object of the invention is the provision in such a system of means for automatically supplying lubricant under high pressure in certain abnormal conditions to "frozen" bearings to clear such bearings, while normally supplying the lubricant to the bearings only under relatively low pressure, and the provision of means effective after said bearings have been cleared for continuing to supply an additional amount of lubricant to said bearings under relatively low pressure.

A further object of the invention is to provide in such a system means for indicating to the operator the fact that the lubricant is being properly supplied to the bearings.

A further object of the invention is to provide in such a system means for indicating to the operator whether there is a proper supply of lubricant in the supply tank.

A further object of the invention is to provide a one-shot system of lubrication which will be relatively inexpensive to manufacture and operate.

A further object of the invention is to provide a system of lubrication having the above stated characteristics which shall be relatively free from interruptions to service.

A further object of the invention is to provide for means combined with such a system capable of utilizing the lubricant normally supplied to the engine bearings for lubricating other parts of the automobile which may need lubrication.

A further object of the invention is to provide means for lubricating all of the bearings of an automobile which means shall be most active when the automobile is traveling and least active when the automobile is still.

Further objects will be apparent after a reading of the specification and claims and after a consideration of the accompanying drawings.

In order to explain the invention more clearly two embodiments thereof are shown in the accompanying drawings, in which:

Fig. 5 is a diagrammatic view showing a system of lubrication for an automobile in which the motor and the motor oil are utilized in lubricating all of the other bearings as well as the motor bearings and including a control valve as a part of said system;

Fig. 6 is a view similar to Fig. 5, but showing the control valve in a different position;

Fig. 7 is a view also similar to Fig. 5 showing the control valve in a still different position;

Fig. 8 is a view in section of the control valve shown in Figs. 5, 6, and 7 taken at right angles to the views of Figs. 5, 6, and 7; and Fig. 9 is a view in end elevation of the valve of Figs. 5, 6, 7, and 8.

In general the systems shown in illustration of my invention comprise in combination individual means for storing a small predetermined amount of lubricant adjacent to each bearing to be lubricated, and means for supplying by one operation a predetermined amount of lubricant to each of the storage reservoirs. Each of the first means comprises a lubricant fitting or cup of novel design positioned above the bearing and having free communication with the bearing by which lubricant may have a restricted flow by gravity from the cup to the bearing. Normally each of these fittings is tightly closed at its upper end to prevent the entrance and exit of both air and lubricant into or from said fitting from the upper end. The downward flow of lubricant to the bearing is extremely slow and for a long period of time, depending upon the entrance of air around the bearing and upon the bubbling up of the air through the lubricant. Moreover, this arrangement insures not only that the bearing shall be fed with lubricant slowly and gradually, but also that the bearing shall receive greater lubrication while the car is traveling and the cup is being shaken than when the car is standing still. Instead of providing a relatively fast and easy discharge, this invention contemplates just the reverse, making it almost impossible for the lubricant to escape to the bearing and in such cases where maximum retardation is sought, the cup would be attached upside down so as to demand still greater agitation before any lubricant could be shaken out of the cup.

The means for supplying lubricant to the individual storage reservoirs may be any one of several. I have shown two novel systems by which the lubricant can be thus supplied. One of these shown in Figs. 1 and 2, comprises a hand operated pump in which the lubricant is forced to the various individual reservoirs by positive pressure. The other is shown in Figs. 5 to 8, inclusive, and comprises a system in which the oil, being normally continuously pumped through the motor by the motor pump, is diverted periodically for a very short time by a valve of such construction that the lubricant may be supplied to the various individual reservoirs.

Figure 2:
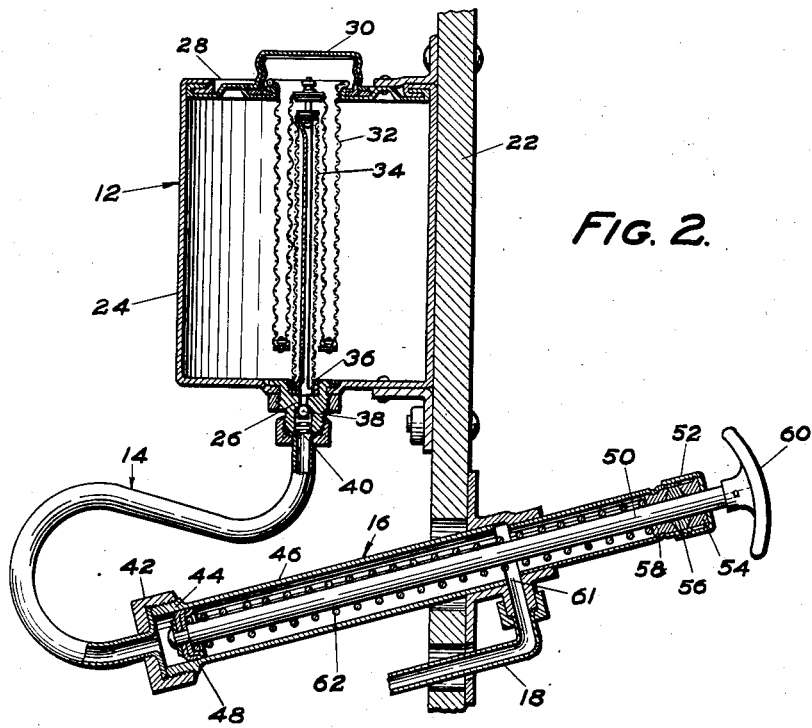
Fig. 2 is a view on an enlarged scale and in section of the pump and central reservoir shown diagrammatically in Fig. 1.
Figure 1:
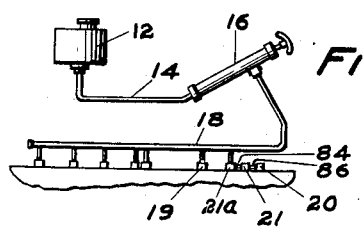
Fig. 1 is a diagrammatic sketch illustrating an automobile equipped with one form of lubrication system constructed according to my invention.

Referring particularly to the drawings, I have shown in Figs. 1 and 2 a hand operated system embodying my invention. In Fig. 1 there is shown a central oil reservoir 12 connected by a conduit 14 to a hand operated pump 16 from which the lubricant is forced through a conduit 18 to individual oil reservoirs such as 19, 20, 21, and 21a, and individual cup reservoir such as one of those illustrated being provided for each of the bearings to be lubricated.

As shown in Fig. 2, the central reservoir generally designated 12 may be secured, if desired, to a support 22 and may include a body portion 24, an outlet plug 26, a relatively permanent cover 28 and a removable cap 30. The latter covers an opening through which lubricant may be supplied to the reservoir. A strainer 32 is provided for removing from the lubricant poured into the reservoir 12 any foreign matter. A strainer 34 is provided as an additional safeguard to prevent impurities from passing out from the reservoir 12 into the conduit 14, the lubricant being allowed to pass from the reservoir 12 through the opening 36 in the plug 26. A check valve 38 is resiliently maintained upon its seat in the passage 36 by a spring 40 and prevents the passage of lubricant back from the conduit 14 into the reservoir 12.

The pump generally designated 16 includes an end cap 42 through which the outlet end of the conduit 14 passes and which is secured to the enlarged end 44 of a barrel 46. Within the barrel 46 there is positioned a cup 48 which may be of leather or other suitable material and which serves as a piston for raising lubricant through the pump and forcing it out through the conduit 18. The cup 48 is secured to one end of a rod 50 which passes up through the barrel. The upper end of the barrel 46 is closed by a cap 52 and by packings 54, 56 and 58. The upper end of the rod 50 is provided with a handle 60 by which the rod 50 and the cup 48 may be raised to force out lubricant, and the barrel 46 is provided with an outlet port 61 through which lubricant is forced to the conduit 18. Within the barrel 46, the rod 50 is surrounded by a compression spring 62, which is adapted to return the cup 48 together with the rod 50 (whenever the latter is released by the operator) to the normal position which is substantially as shown in Fig. 2, the lubricant passing by the edges of piston cup 48.

Figure 3:
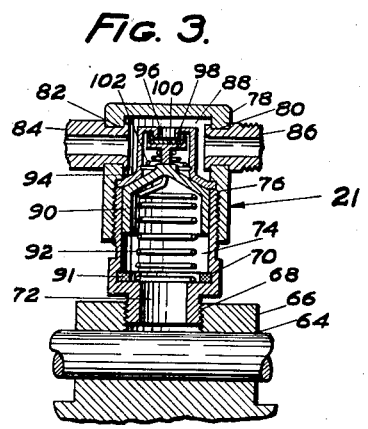
Fig. 3 is a view in section and on a much more enlarged scale of an individual fitting provided with a supply reservoir and attached to its individual bearing which is to be lubricated, shown as after the operation of the filling of the individual fitting has been completed and before the next filling operation has started.
Figure 4:
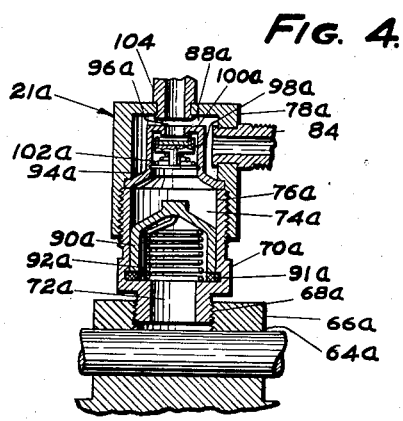
Fig. 4 is a sectional view similar to Fig. 3 of a different but similar individual fitting attached to its individual bearing shown with the fitting in process of being filled with lubricant and still under pressure from the supply, according to the teaching of my invention.

In Figs. 3 and 4 are illustrated two of the individual reservoir fittings such as are provided for each of the bearings to be lubricated. In Fig. 3 is shown the individual reservoir fitting generally designated 21, and associated therewith is shown a bearing comprising a shaft 64 mounted in a journal bearing 66, said journal bearing being formed with an internally threaded recess 68. Screwed into the recess 68 is a body member 70 formed with a fairly large passage 72 through which lubricant may pass to the bearing and formed with an even larger cylindrical opening or reservoir 74 within which lubricant may be stored in a predetermined amount for the retarded feeding to the bearing, the rate of which feeding depends almost entirely upon the motion of the automobile. The body member 70 is externally threaded at its upper end at 76 and screwed on to said upper end is a cylindrical cap 78 which thus forms a closure for the upper end of the reservoir 74. The cap 78 is formed with a pair of openings 80 and 82 into which branch conduits 84 and 86 are inserted so that lubricant may pass into and out of the chamber 88 formed in the upper part of cap 78. Telescoping within the body 70 is a cup plunger 90 which at times is urged down to contact at its lower edge with a gasket 91 and make a tight joint therewith, but is normally urged by the spring 92 to the position shown in Fig. 3. Secured within a circumferential recess formed by the junction of the body 70 and the cap 78 is a check valve partition casing 94 which is provided with an axial opening 96. Normally resting upon a downwardly projecting seat surrounding the opening 96 is a check valve 98 provided with a packing 100. This valve 98 is resiliently urged to said closed position by a spring 102 having its lower end resting on a shoulder formed in the valve casing 94. In Fig. 4 an almost identical individual reservoir fitting 21a is shown. Therein parts similar to parts shown in Fig. 3 are indicated by like numerals provided with a suffix "a". It is to be noted that the branch conduit 84 which is connected to the cap 78 of fitting 21 is inserted through the opposite side of the cap 78a of fitting 21a and the cap 78a is provided with a branch conduit 104 extending through the top of the cap. The branch conduit 104 provides a lubricant line through which lubricant is supplied to the fitting 21a from the conduit 18, the excess supply thereof passing out from the fitting 21a through the branch conduit 84 to the fitting 21. It is to be further noted that the cup-shaped plunger 90a as shown in Fig. 4 is moved downward to contact with the gasket or packing 91a and is in its lowest, shut off position. Moreover, the valve 98a is shown moved from its seat, which position would be maintained only momentarily as it would instantly close after piston 90a is upon gasket 91a.

It is thought that the operation of this embodiment of my invention will be clear from the above description. The central reservoir 12 having been filled with lubricant through the opening normally covered by the cap 30 and the lubricant having been strained through the strainer 32, a pull exerted by the operator on the handle 60 draws the cup piston 48 upward and thus creates a suction which serves to unseat the ball valve 38 and draw the lubricant by suction through the strainer 34 into the conduit 14 and thence into the barrel 46 of the hand pump 16. A release of the handle 60 allows the spring 62 to move the rod 50 and the cup 48 downward to the position shown in Fig. 2. The lubricant in the conduit 14 and the barrel 46 being prevented from returning to the reservoir 12 by the check valve 38, is then forced more or less slowly past the cup piston 48 to the upper part of the barrel 46. Assuming that a previous operation of the pump has filled the upper part of the barrel 46, the upward pull on the handle 60 and the piston 48 previously described, also forces lubricant out through the outlet port 61 to the conduit 18 from which it is supplied by the several branch conduits such as 104, 84, and 86 to all of the fittings corresponding to the fittings 19, 20, 21, and 21a.

By the operation of the pump the operator is able to determine whether the system is operating efficiently. If little or no resistance is encountered there is an indication that the supply container is empty or nearly so. If, during a part of the stroke, a normal recognized resistance is encountered and then the piston comes to a stop before taking the full travel, it is an indication that the system is working properly and that all reservoirs are filled. If, after the piston has come to the normal stopping point, it may still be moved, it is an indication of leaky joints.

Inasmuch as the operation of the system in each of the fittings is like that in the others, the operation in one only will be described. After lubricant has been supplied to the upper chamber 88a, this lubricant acting under relatively high pressure forces the check valve 98a open and with said valve open, forces the piston 90a downward so that lubricant fills the reservoir 74a above the piston. After the fitting is filled the flow is stopped because the cup 90 seats upon the seat 91. Thereupon, the check valve 98a is closed by spring 102a and the spring 92a acting on the piston 90a forces the piston slowly upward, forcing the lubricant to seep past from over the loose fitted piston 90a and flow to its underside, there being no ejection of the lubricant while the piston is returning to its upward position, and the time it takes to return having no influence upon the rate of feed to the bearing. The lubricant remains in this lower part of the reservoir for such a period of time as is required to substitute replacement air during the operation of the automobile. If it be desired to admit oil to a cup before it has become entirely empty, then the amount remaining will be forcibly ejected to the bearing by the downward travel of the piston. A small portion thereof continuously, slowly and gradually passes downward to the bearings to be lubricated but only so fast as air may bubble through.

When the lubricant is supplied under pressure through the branch conduit 104 the pressure acts first to move the valve 98a from its seat pushing down therewith the cup piston 90a. The pressure thus must act against the combined force of the springs 92a and 102a. Assuming that at the time the lubricant is being supplied, the portion of the chamber 74a beneath the piston 90a has been substantially emptied of lubricant and that such portion of the chamber is filled with air, the movement downward of the piston forces the air out through the bearing. The upper part of the chamber 74a above the piston 90a is filled with fresh lubricant and upon the relief of pressure in the conduit 18 and the branch conduit 104 the valve 98a returns to its seat under the action of the spring 102a and the cup piston 90a is moved from its seat on the packing 91a by the action of the spring 92a. The piston 90a is formed to make a relatively free fit within the reservoir 74a but under the rapid flow of lubricant supplied from the pump 16 the piston is quickly forced downward and the slight momentary leakage is of no consequence. However, the fit may be so tight that only a small quantity of lubricant may seep past the piston from the upper part of the reservoir 74a to the lower part thereof, allowing the spring 92a to move the piston 90a slowly upward to the position corresponding to that of the piston 90 in Fig. 3. After the lubricant has passed into the reservoir 74a beneath the piston 90a it may flow downward by gravity to the passage 72a to lubricate the bearing 64a. However, on account of atmospheric pressure it may flow down only so fast as air may enter past the bearing and bubble up through the lubricant to the top of the reservoir.

As shown in Figs. 5 to 8, inclusive, I have provided in combination with a motor 103 a lubricant supply line 105, a lubricant discharge line 106, a lubricant pump 106a and a filter 108. Leading from the filter 108 is an intermediate lubricant line 110 in which intermediate lubricant line there is interposed a lubricant pressure gage 112. As shown in Fig. 8, lubricant supply line 110 leads to a tandem control valve formed by a double valve plug 113 and a valve casing 114. The lubricant supply line 105 as well as a cup supply lubricant line 122 are also shown as connected to the valve casing 114. The auxiliary branch 116 is connected to the line 110 and at its opposite end to a pressure relief valve 118. Also connected to the pressure relief valve 118 is a return flow lubricant line 120 which is adapted to return lubricant to the sump of the motor 103. The cup supply lubricant conduit 122, connected at both ends to the valve casing 114 leads past individual lubricant reservoirs 124 for some or all of the bearings of the automobile not ordinarily lubricated by the conventional motor lubrication system. Adjacent to one end of the conduit 122 I have provided for purposes later to be stated, an air compression tank 128, provided with an air inlet check valve 129. The plug or core 113 mounted in the valve casing 114 is provided with two sets of portings, the pressure portings on line A—A and discharge portings on line B—B. The pressure port 115 in the valve plug is at all times in communication with the lubricant supply line 110 and is connected at times with conduit 105 and at other times with end 122a, the end 122a being the pressure admitting end of cup supply line 122. There are two similar ports 126 and 127 in valve plug 113 on line B—B. A restricted connection 132 from pressure line 110 to motor supply line 105 permits a small amount of lubricant to be delivered to the engine while valve port 115 is out of register with line 105, the amount being regulated by valve 136.

The plug 113 has a valve stem 138 attached thereto and at the end of the valve stem a handle 140 is detachably secured. A packing is provided for the valve stem that presses the valve into its conical seat, the shoulder 141 taking the thrust and elastic gasket 142a at the inner end of valve resisting the thrust. The packing bushing 143, packing gland 144 and packing 145 complete the packing and thrust of valve 113. Shown formed on valve body 113 is a stop disk 146 having two slight depressions 147 for end of stop pin 142 to be thrust by its spring 148, the normal position of stop 149 being tapped so that the stop pin may be screwed into same by means of handle 150 at end of stop pin. The handle extension 151 has a tension spring 152 attached, the spring being of sufficient strength to overcome the resistance of stop pin 142 when in stop recesses 147 and return valve to its normal position with stop pin at 149 if not so done by the operator. The position of the parts shown in Fig. 8 is that assumed when the valve has been turned half way around, with full tension on closing spring 152.

While it is believed that the operation of this system will also be apparent from the above description, a brief review thereof will be given. Normally the lubricant is supplied (as shown in Fig. 5) under pressure by the pump 106a through the conduit 106, the valve casing 114, and the supply line 105 to the various bearings of the motor to be lubricated. The lubricant after use is drawn from the sump of the motor by pump 106a in the sump and discharged through the discharge line 106 back through the filter 108 and supply line 110 to the valve. Should the pressure in the lines become excessive, lubricant may pass from the line 110 through the connection 116, the pressure relief valve 118, and the line 120 direct to the sump of the motor.

Should it be desired, however, to lubricate other parts of the automobile, this can be done by a proper manipulation of the plug 113 in the valve casing 114. By turning the plug to the position shown in Fig. 6, it may be seen that the cup supply conduit 122 will be connected at one end 122a through bore 115 with supply line 110 and through the curved bore 127 and the branch conduit 130 with the conduit 120. Thereupon the air which has been expanded from the air chamber 128 while in the position in Fig. 5 will be forced out by the oil passing through the conduit 122 to the sump, and inasmuch as the pump 108 will continue to force more lubricant through the conduit 110, the bore 115, and the conduit 122, said conduit and cups 124 will be warmed and congealed lubricant which may be therein will be softened or forced out.

The operator may next turn the plug of the valve to the position shown in Fig. 7. Thereupon the pump 106a will continue to supply lubricant through the conduits 106 and 110 to the conduit 122, through the bore 115 and connection 122a. The opposite end of the conduit 122 will be closed. Inasmuch as the relief valve 118 is operative at all times, the pressure in the conduit 122 will be raised to that controlled by the pressure relief valve 118, the individual bearing reservoirs 124 will be filled with a new supply of lubricant, and air will again be compressed in the air chamber. Through continued operation the air in the air chamber 128 may become partially depleted. At any convenient time, however, the air chamber and the oil lines may be filled with air from an air supply hose through air check valve 129, at the same time blowing (inasmuch as the parts are in the position shown in Fig. 5) all lubricant in the lines to the sump of the motor.

The operation of filling the individual reservoirs is almost instantaneous and an exactly measured predetermined amount of lubricant is supplied regardless of varying conditions. At all times a small outlet from 110 to 105 is provided through the connection 132 and its regulating valve 136, so that a small quantity of lubricant will always be supplied to the motor bearings. In view of this and the fact that the time required for filling the individual reservoirs 124 is so short, no injury can occur to the motor during that time. The valve is then turned to the position shown in Fig. 5 for continued normal operation of the motor lubrication system, and in doing so, the end of conduit 122 opposite the air chamber is opened to the sump through valve port 126a which permits the confined air in air chamber to blow the confined oil in 122 out of same.

It is to be understood that the above described embodiments of the invention are for the purpose of illustration only, and various changes may be made therein without departing from the spirit and scope of the invention.

I claim:

1. In a system for supplying lubricant to machinery, motive means, bearings included in said motive means, other bearings associated with said motive means, an oil pump normally adapted to supply lubricant to bearings of said motive means, a plurality of individual reservoirs for each of the other said bearings, a conduit connected to all of said individual supply reservoirs, and a valve for selectively causing the flow of lubricant to said bearings of said motive means or to said conduit.

2. In a lubrication system for an automobile, a motor therefor, bearings included in said motor, a plurality of other bearings, means associated with each of said other bearings and comprising a storage reservoir for storing a predetermined amount of lubricant adjacent to each of said other bearings, means for delivering the stored lubricant slowly and gradually from their associated reservoirs to each of said other bearings, and means for selectively delivering a predetermined amount of lubricant to each of the storage reservoirs, said last named means comprising a lubricant pump normally supplying lubricant to the bearings of said motor, a plurality of lubricant lines through which said lubricant passes in the course of being supplied to said motor by said pump, a valve connecting said lubricant lines, another conduit connected to said valve and leading to said storage reservoirs, and means for turning said valve to cause lubricant selectively to be supplied to said motor bearings through said lubricant lines or to be supplied to said individual reservoirs through said conduit.

3. In a lubrication system, a conduit, means for supplying lubricant to said conduit, an air compression chamber in open communication with said conduit for at times aiding in clearing said conduit of lubricant, and means for refilling said air compression chamber and said conduit with air.

4. In combination, a container for heated lubricant, lubrication fittings, conduits connecting said container and said fittings, means for forcing lubricant at low pressure from said container through the conduits and back to the container so as to eject air from the conduits and to cause the conduits to become heated, and means for raising the lubricant pressure in said conduits and for causing lubricant to be delivered to the fittings.

5. In a lubrication system, a conduit, a lubricant reservoir connected with said conduit, means for supplying lubricant through said conduit to said reservoir, and an air compression chamber also connected to said conduit and in open communication therewith for at times aiding in clearing said conduit of lubricant.

WILLIAM L. MORRIS.